P. McILROY.
CONDUIT OR PIPE.
APPLICATION FILED JAN. 20, 1915. RENEWED MAR. 30, 1918.

1,291,577. Patented Jan. 14, 1919.

Witnesses:
T. B. Humphries.
C. L. Laudon.

Inventor:
Peter McIlroy,
By J. W. Cooke
Attorney

UNITED STATES PATENT OFFICE.

PETER McILROY, OF ALLISON PARK, PENNSYLVANIA, ASSIGNOR TO ENAMELED METALS COMPANY, OF SHARPSBURG, PENNSYLVANIA, A CORPORATION OF PENNSYLVANIA.

CONDUIT OR PIPE.

1,291,577. Specification of Letters Patent. Patented Jan. 14, 1919.

Application filed January 20, 1915, Serial No. 3,245. Renewed March 30, 1918. Serial No. 225,839.

*To all whom it may concern:*

Be it known that I, PETER MCILROY, a citizen of the United States, and a resident of Allison Park, in the county of Allegheny and State of Pennsylvania, have invented a new and useful Improvement in Conduits or Pipes; and I do hereby declare the following to be a full, clear, and exact description thereof.

The present invention relates to new and useful improvements in pipes or conduits of the type employed particularly in connection with electric wiring.

Specifically this invention pertains to an improved method of preparing the pipes or conduits and their couplings for shipment or storage prior to their installation.

As is well known it is customary to coat electric pipes or conduits with enamel or the like so that the pipes will be protected against corrosion both before and after installation.

By the present method the lengths of pipe are completely immersed or dipped in the enamel, and it is therefore obvious that the threads of the terminals of the pipe become clogged with the enamel, and must be cleaned before couplings can be properly applied. It is also at present customary to partially thread the couplings on the terminals of the pipes and to coat the couplings with enamel during the coating of the pipes. Thus not only the external threads of the pipe terminal but also the internal threads of the couplings must be cleaned before the conduit is used.

In some instances protectors which are in the nature of metal ferrules are applied to the threaded terminals of the pipes instead of couplings before the coating has been done. An objection to this system is that during the coating process the enamel enters the threads between the protectors and the pipe, and owing to the non-porous character of the metal protectors such coating material is prevented from subsequent evaporation or escape during the baking operation thus causing the two elements to adhere to each other making necessary the cleaning of enamel from the threads before the conduit can be properly laid. Furthermore these metallic protecting ferrules are relatively costly and are objectionable for this reason also.

This invention aims as its principal object to eliminate the necessity of cleaning the threaded ends of the conduit forming pipes and the couplings by applying to the pipes and the couplings protecting sleeves which will effectively protect the pipe threads against corrosion, damage by contact with foreign objects and coating by enamel during enameling process, and which are formed of such material that they may be easily cut and removed leaving a clean thread both on the pipe and coupling.

An additional object of the invention is to so design the protecting sleeves that they may be applied to the couplings and the pipes prior to the treatment of the same with the enamel, so that the enamel will itself constitute the binding agent necessary for properly holding the protecting sleeves in place during transit or storage.

Another object of the invention is to provide a protecting sleeve which may be inserted in the pipe coupling to effectively protect the threads thereof against injury by contact with foreign objects, and is formed from material of an absorbent nature which is necessarily porous, so that the relatively small amount of enamel which finds its way into the threads of the coupling during the coating process will be absorbed or taken up by the protector, leaving the threads of the coupling clean, except for a very thin film of enamel which is hardened when the conduit is baked, the porous nature of the sleeve allowing the escape of the gases caused by the drying of the enamel during the baking thereof.

The above and other incidental objects of a similar nature, which will be hereinafter more specifically treated, are accomplished by such means as are illustrated in the accompanying drawings, described in the following specification and then more particularly pointed out in the claims which are appended hereto and form a part of this application.

With reference to the drawings wherein there is illustrated the preferred embodiment of the invention as it is reduced to practice, and throughout the several views of which similar reference numerals designate corresponding parts:

Figure 1:
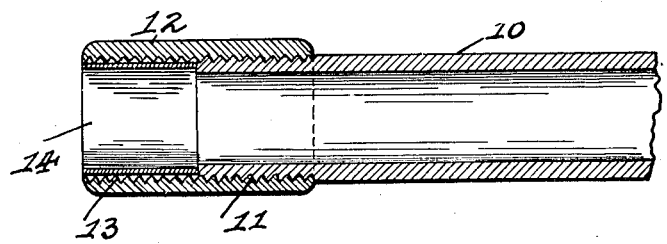
Figure 1 is a longitudinal section taken medially through a pipe section, with a coupling and protecting sleeve applied.

In the accompanying drawings the numeral 10 designates the length of pipe which is terminally threaded, as indicated at 11. To this threaded terminal of the pipe is preferably applied a coupling sleeve 12, which is of the well known type, and is provided with internal threads 13. When the coupling is threaded home its outer end projects a considerable distance beyond the terminal of the pipe. Within the projecting portion of the coupling member is inserted a protecting sleeve indicated by the numeral 14. This protecting sleeve 14 may be formed of any suitable material such as paper, linen, pulp, wood-pulp or fiber composition, the only requirements being that the material be absorbent, porous and of a fragile nature so that it may be crimped, cut or otherwise mutilated to permit of its ready removal from the coupling.

The method of preparing the conduits and couplings for shipping is briefly as follows:—The pipe is first cleaned to remove the scale, etc., by immersion in sulfuric acid or any other equivalent thereof. The pipe is then threaded at both ends. After this cleaning or pickling process and the threading has been completed the coupling sleeve is threaded on to the terminal of the pipe a sufficient distance to cover the threads thereof, and the protecting sleeve 14 is then inserted in the projecting portion of the coupling. In this connection it is to be noted particularly that the member 14 is of such length that its outer terminal is flush with the outer end of the coupling. The member 14 may be made with an external diameter which is slightly greater than the internal diameter of the coupling, so that the threads of the coupling will bite into the sleeve for the obvious purpose of preventing accidental displacement of the sleeve. After the coupling has been applied to the pipe, and the protecting sleeve 14 has been inserted in the coupling all three elements are dipped in the enameling vat and are completely coated with enamel. As will be clearly obvious upon reference to Fig. 2 the enamel serves as a binder for holding the protecting sleeve 14 in the proper position within the coupling and forms the coating 15.

It is now desirable to direct particular attention to the fact that the protector sleeve is made from material which is of an absorbent and porous nature. As hereinbefore explained material of this kind is particularly effective in protectors of this type, for effecting the removal of any excess enamel which by entering between the coupling and protector seeps into the threads of the coupling during the coating. A further feature is that the absorption of the enamel by the protecting sleeve affords for the sleeve an impregnating element which will render the sleeve waterproof and enable it to withstand different weather conditions without danger of disintegrating even though the pipes or conduits lay in storage for a considerable length of time.

In some instances it is desirable to ship a number of the coupling sleeves without the pipes. In such cases the coupling sleeves are provided as shown in the modified form of the invention in Fig. 4 with an internal protecting sleeve 16. The coupling and member 16 as shown in Fig. 4 are treated with an enamel coating 18, which serves in the manner hereinbefore explained to both protect the outer face of the coupling against corrosion and to assist in maintaining the protecting sleeve in the proper position.

Figure 4:
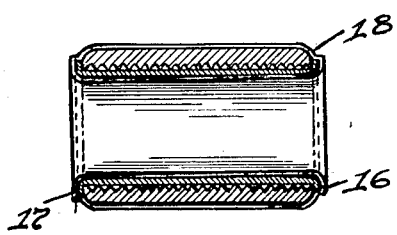
Fig. 4 is a detail view in longitudinal section of a coupling equipped with the modified form of protector.
Figure 5:
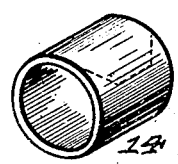
Fig. 5 is a detail perspective view of the protector shown in Figs. 1, 2 and 3.

The terminal edges of the protecting sleeve as shown in Fig. 4 are directed outwardly and form annular laterally extending lips or rims 17 which engage against the terminals of the couplings and serve as protecting cushions therefor.

Figure 2:
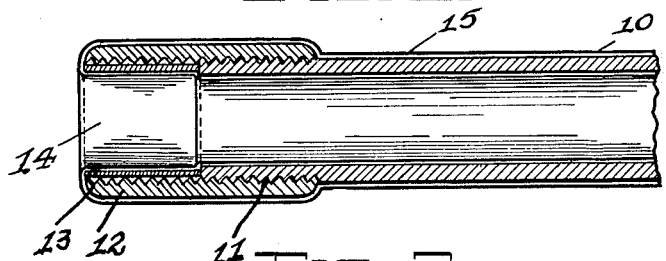
Fig. 2 is a longitudinal section taken medially through the pipe, coupling and protector and showing a coating of enamel ensheathing the said elements.
Figure 3:
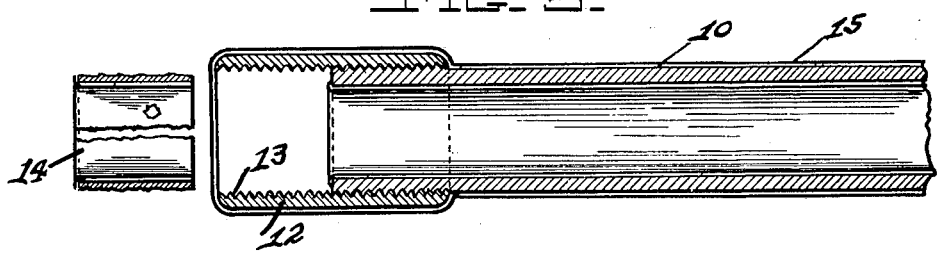
Fig. 3 is a view similar to Fig. 2 with the exception that the internal protector of the coupling is shown as removed.

If desired the protecting sleeve shown in Figs. 2 and 3 may be equipped at its outer terminal with a lip similar to the members 17 of Fig. 4.

In reduction to practice it has been found that the form of my invention, illustrated in the drawings and referred to in the above description, as the preferred embodiment, is the most efficient and practical; yet realizing that the conditions concurrent with the adoption of my invention will necessarily vary, I desire to emphasize the fact that various minor changes in details of construction, proportion and arrangement of parts may be resorted to, when required, without sacrificing any of the advantages of my invention, as defined in the appended claims.

What is claimed is:

1. The combination with a conduit unit adapted to be coated with a layer of protective material, of a coupling partially fitted thereon, and a protecting sleeve of absorbent material arranged within the projecting portion of the coupling and engaging the threads thereof, said coupling and sleeve being secured in position before said coating is applied, said protecting sleeve being adapted to absorb such of the protective material as may find its way into the threads when the unit is coated.

2. In combination with a conduit unit having threaded terminals and adapted to be coated with a layer of protective material, of a protecting sleeve of fibrous porous material surrounding said threaded terminals, said sleeve being secured in position before said coating is applied and said sleeve being adapted to prevent the protective material from filling said threads.

3. In combination with a conduit unit having threaded terminals adapted to be coated with a layer of protective material, of a protecting sleeve of absorbent material surrounding said threaded terminals, such sleeve being secured in position before said coating is applied and said sleeve being adapted to prevent the adherence of an excess of protective material to said threads.

4. In combination with a conduit unit having threaded terminals and adapted to be coated with a layer of protective material, of a protecting sleeve of paper surrounding said threaded terminals, said sleeve being secured in position before said coating is applied and said sleeve being adapted to prevent the protective material from filling said threads.

5. The combination with a conduit unit adapted to be coated with a layer of protective material, of a coupling partially fitted thereon, and a protecting sleeve of fibrous porous material arranged within the projecting portion of the coupling and engaging the threads thereof, said coupling and sleeve being secured in position before said coating is applied and said sleeve being adapted to prevent the protective material from filling said threads.

6. The combination with a conduit unit having threaded terminals and adapted to be coated with a layer of protective material, of a protecting sleeve of absorbent material surrounding said threaded terminals, said sleeve being secured in position before said coating is applied and said sleeve being adapted to prevent the excess protective material from filling said threads.

In testimony whereof, I the said PETER McILROY, have hereunto set my hand.

PETER McILROY.

Witnesses:
J. N. COOKE,
C. L. LANDOU.